Figures 1, 2:
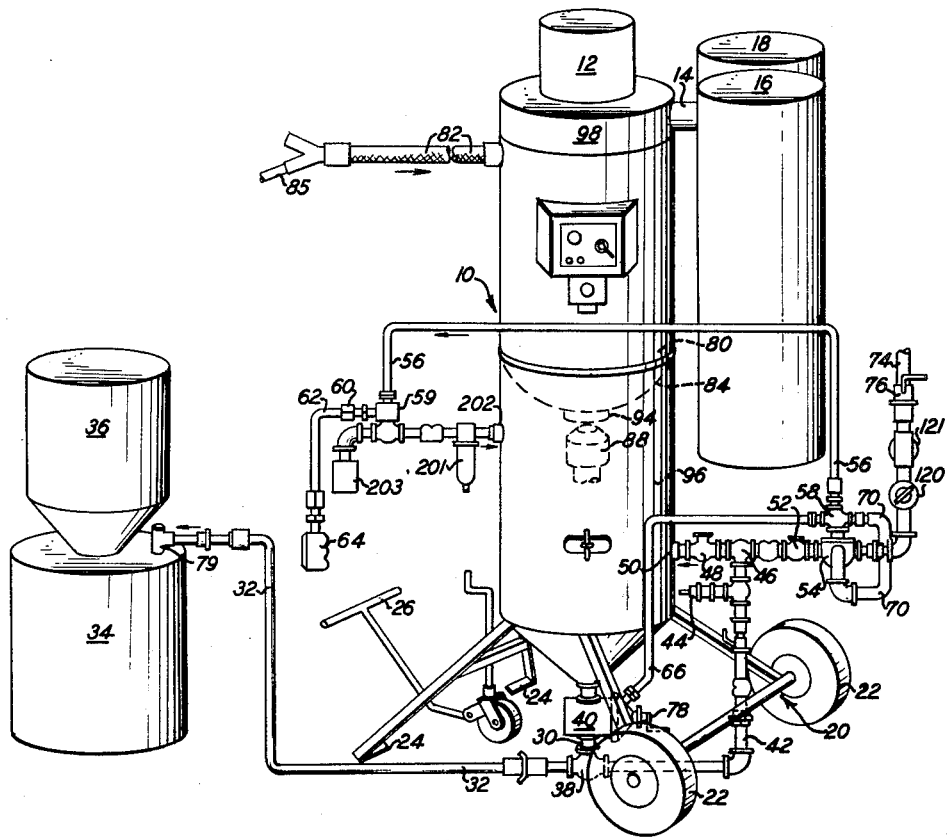

June 30, 1964  L. HELLMANN ETAL  3,138,845
GLASS PEENING MACHINE AND DUST-COLLECTING SYSTEM
Filed Aug. 14, 1962  2 Sheets-Sheet 1

INVENTORS
LEON HELLMANN
DONALD L. TEMPLE
BY *Mason, Mason & Albright*
ATTORNEYS

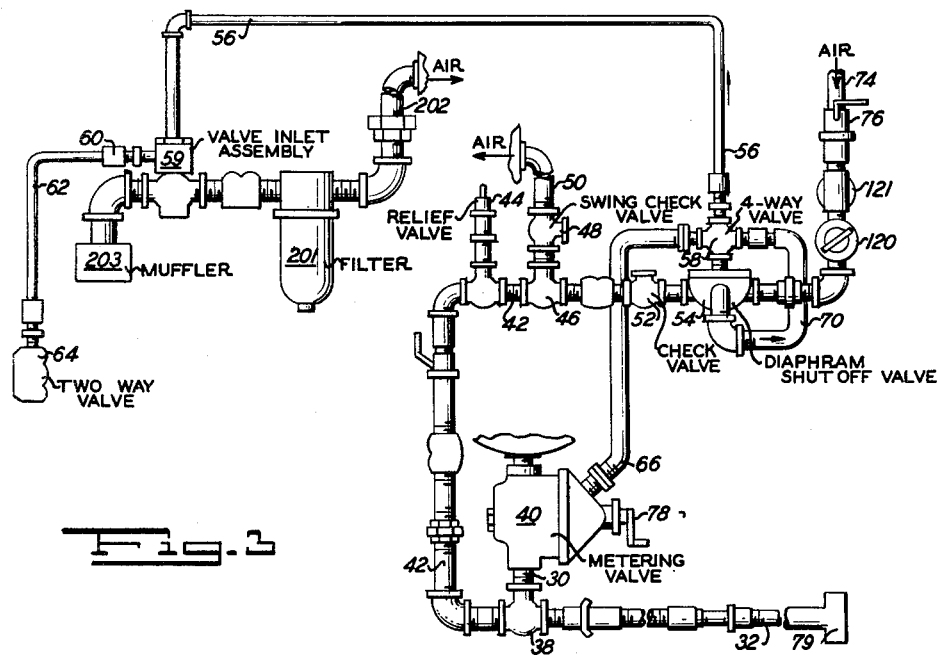
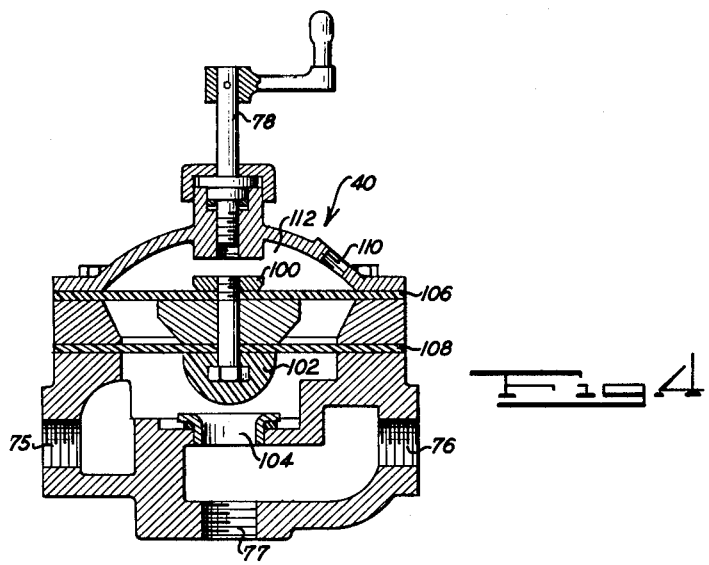

United States Patent Office 3,138,845
Patented June 30, 1964

3,138,845
GLASS PEENING MACHINE AND DUST-COLLECTING SYSTEM
Leon Hellmann and Donald L. Temple, Washington, Mo., assignors to Zero Manufacturing Co., Washington, Mo., a corporation of Missouri
Filed Aug. 14, 1962, Ser. No. 216,861
8 Claims. (Cl. 29—90)

This invention relates to a machine for treating metallic surfaces by projecting glass beads under pressure against the surfaces to be treated for microscopic crests, ridges, and depressed or raised portions. Generally speaking, therefore, the invention relates, or is directed, to a machine for improving the surface characteristics of metal members of various kinds—for example, to remove rust from metal surfaces, for removing carbon from metal parts, such as pistons and cylinders of an internal combustion engine. The invention may also be used for deburring, descaling, paint removal, weld scale removal, and for sealing porous surfaces of metal objects. The surfaces of the workpieces are contacted with glass beads which pass through a flexible hose on the way to the nozzle. The hose may be of such length so as to permit peening all surfaces of cabinet-type and walk-in type of enclosures and all surfaces of other objects that require treatment.

An object of the invention is to improve the surfaces of both ferrous and non-ferrous metals, wood, plastic, etc., and their alloys by the use of glass beads ranging in size from about 0.0005" to 0.046", which balls are projected at high velocity against the metal surfaces to be treated.

Another object is to treat metal surfaces utilizing a machine which produces a chemically pure, mat-satin finish while retaining close tolerances. This finish differs under a microscope from polished and honed parts. The latter method leaves a scratched surface similar to furrows in a newly plowed field as viewed through a microscope, whereas surfaces treated with a machine of this invention are uniform.

Another object is to provide a machine whereby the peened surface after treatment is far superior to the unpeened surface. For instance, peened parts of stainless steel have out-lasted similar unpeened parts more than ten times in the presence of air-saturated hot water. Similar results have been reported from the aircraft industry for aluminum alloys in marine atmospheres.

Yet another object is to provide a system whereby the glass balls may be recovered and used again after the separating of the dust and fractured bead particles therefrom, all in a continuous cycle.

An additional object is to provide a medium which will not scratch the surface of the article being worked upon. This medium will not leave a chemical deposit on the surface following the peening treatment. No substantial abrasive action accompanies the peening of the surface of the workpiece being worked upon.

Other objects will appear hereinafter throughout the specification.

FIGURE 1 is a perspective view of the apparatus.
FIGURE 2 is an enlarged view in section of the opening and of the closure member;
FIGURE 3 shows diagrammatically a pipeline circuit and appurtenant parts connected thereto;
FIGURE 4 is a vertical sectional view of the metering valve structure.

Referring to FIGURES 1 and 2 of the drawings, 10 is a separator housing or tank having a motor 12 and a conduit 14 leading to the bags 16 and 18.

The separator housing is mounted on a carriage 20 having wheels 22, feet 24 and a handle 26.

Located at the lower end of the separator housing is the metering valve 40. Connected to the metering valve is an air pipe 30 for conveying glass beads from the metering valve to the nozzle, which is located on the end of the hose 32, as seen in FIGURE 3.

As shown in FIGURE 1, the nozzle has been forced into an opening in the top of a can or receptacle 34 having a dust bag 36 attached to the same.

When it is desired to clean the apparatus, the nozzle is inserted in the opening in the can, and the separator housing, which forms the receptacle for the glass beads, is cleansed by a current of air passing through which passes out of the end of the pipe 32 into the can 34.

It will be understood that the nozzle may be used for any type of work where a cleaning, particularly a peening, operation is required. In other words, the nozzle at the end of the hose 32 may be used inside a walk-in type enclosure for cleaning the walls or objects within the same; or it may be used on the exterior of the same enclosure, assuming a metal surface is to be peened.

Attached to the bottom of the separator 10 is a metering valve 40, shown in detail in FIG. 4. Connected to the bottom of metering valve 40 by pipe 30 is a T 38, on one side of which is pipe 38 leading to nozzle 79, and on the other side of which is piping 42 leading, in turn, to relief valve 44, T 46, check valve 52 and into diaphragm shut off valve 54. To T 46 is also connected the swing check valve 48 leading to pipe 50 which is connected to the lower part of separator housing 10.

Air is admitted to the opposite side of the diaphragm shut off valve 54 by air entering pipe 74 and passing, in turn, through hand operated valve 76, filter assembly 121 and air regulator 120, thence into valve 54.

Attached to the top of valve 54 is a four way inlet valve 58 on one side of which is a pipe 70 also leading from valve 54 and on the other side of which is pipe 66 leading to/from metering valve 40. To the top of four way valve 58 is connected air hose 56 leading to valve inlet assembly 59 which, in turn, is connected to two-way valve 60 via pipe 62 and adapter 60. To the bottom of valve inlet assembly is connected a T to which, on one side, is connected muffler 203 and, on the other side, filter 201 and pipe 202 which delivers air under pressure directly into the lower part of separator housing 10.

The separator housing 10 is divided into two parts, the glass beads being automatically fed into the upper chamber 80 thereof after use. The automatic feeding is accomplished by the use of a flexible trunk or conduit 82 that is connected or located so that its end 85 will pick up, by suction, the expended beads after the peening operation.

The chamber 80, which is the upper chamber of the casing 10, is provided with a curved partition 84 as shown in FIG. 1. This partition extends entirely across the interior of the casing and is funnel shaped in cross-section.

The inverted apex of the funnel 84 is provided with an opening 86 (see FIGURE 2). This opening is closed by a pressure-operated valve member 88, which is forced upwardly when there is pressure in the pipe 90. As long as there is pressure in the pipe 90, the valve member 88 will be forced upwardly against the seat which, in this case, is an O-ring 92 mounted in the housing 94 to hold the glass beads in the upper receptacle. Beneath the curved partition 84 is the lower chamber forms the pressure chamber or the blasting section, from which the beads are removed by pressure and conveyed to the nozzle through the air pipe 30.

At the start of the operation, the peening or blasting medium is loaded into the lower section. Glass beads are automatically fed into the pressure chamber when the blasting operations cease. This is accomplished by relieving the interior pressure. This unit is equipped with fifty feet of static dissipating blasting hose 32 whereby the nozzle may be moved to various places for peening operations without moving the entire apparatus. The unit is automatically in operation when the operator opens the nozzle 79, i.e., the control is of the "dead-man" type at the nozzle whereby, as soon as the operator releases pressure on the valve in the nozzle, pressure within the apparatus is discontinued. The starting and stopping of the unit may, therefore, be controlled from a remote location. When the "dead-man" control is actuated, all valves function to permit pressurizing of the lower section 96 of the casing 10 which, in turn, introduces the glass beads into a high-velocity stream of air that conveys and propels them to the nozzle. The upper chamber in the casing operates under a minus pressure to return glass beads to this casing through trunk conduit 82.

As soon as pressure is released from the pressure chamber 96, the valve member 88 falls to the full-line position shown in FIGURE 6, permitting the passage of glass beads from the chamber to the lower section 96, where they are in communication with the lower end of the casing. There is an outlet for the glass beads through the air pipe 30 to the place of use by means of the air pipe 32.

The nozzle 79 which is attached to the end of the air pipe 32 is provided with a venturi internal construction to further increase the velocity of the glass beads as they issue from the nozzle. The glass beads are removed from the work area by suction by means of the trunk conduit 82 to the top of the casing 10, where they fall, by gravity, onto the pile of beads which have accumulated in the chamber 80. However, before these beads have an opportunity to settle within the chamber 80, they are subjected to the action of a separator means 98. Such separator means may be a centrifugal fan separator, the eye of which is located centrally of the pressure chamber 80 and slightly above the trunk 82. This separator preferably has a peripheral-type outlet or conduit 14 which connects to the bags 16 and 18.

The aforedescribed apparatus is designed for the dry method of peening and the beads are not applied in a slurry or liquid.

The beads are preferably chemically pure micronic glass material. They are round beads, as distinguished from beads having sharp edges, the beads being on the order of about 0.0015" to 0.0331" in diameter. These beads can be of even smaller sizes, such as 0.0005" in diameter, and are all preferably formed of optical glass.

The prime motivation of all equipment set out herein is compressed air ranging from 10 p.s.i. to 120 p.s.i., with a more practical application falling within the range of 70 p.s.i. to 120 p.s.i. The other motivation is the motor 12, which drives the separator means 98, and this latter may be controlled by an ordinary wall-mounted hand switch.

As shown in FIGURE 4, the system is provided with a shut-off metering valve indicated by reference numeral 40 in FIGURE 3. The shut-off valve has a hand-actuated crank 78, which is adapted to bear on the valve stem nut 100 of a ball-type valve indicated by reference numeral 102 having a seat 104. Diaphragms 106 and 108 are provided in order to secure positive sealing and prevent leakage around the valve. This valve is also controlled by the pressure within the system, there being an air-pressure pipe from the pressure chamber connected to the threaded opening 110. Metering valve 40 is provided with inlet 76 and outlet 75. Port 77 is an access opening designed to be closed with a threaded plug. It will be observed that when sufficient pressure is exerted on diaphragm 106, or when crank 78 is screwed in, the valve is shut.

It will be noted, by referring to FIGURE 5, that the valve will ordinarily assume the position shown in that figure. However, when air pressure is on the system, i.e., when the system is operating, pressure builds up in the chamber 112, and this closes the ball-type valve 102 which becomes seated on the seat 104.

It will also be understood that, when the parts are in operating condition, the air is turned on, the source of air pressure is located preferably at a remote point. An electric switch of any suitable type is actuated to start the motor 12. This will apply suction to trunk conduit 82 to cause this trunk conduit to pick up used glass particles from the previous operation and return them to the chamber 80, where they are separated by the separator, the refuse and broken beads being passed through the conduit 14 to the bags 16 and 18. At this time, the valve 88 is pressed against its O-ring seat 92, but there is a considerable amount of glass beads in the lower section fed outwardly by the pressure in the chamber 96. As the glass beads issue from the ceramic nozzle, they impinge upon the surface of the workpiece and not only clean the workpiece but they compress it to an extent whereby its outer surface is much harder than it was before the peening operation took place. This operation enhances fatigue life, increases strength and wearing qualities, and reduces stress and corrosion.

As fast as the glass beads are used, they are picked up by the end 85 of the flexible trunk conduit 82 and conveyed to the chamber, where they are separated, so that broken particles may be carried off to the bags 16 and 18, while the whole beads are permitted to drop to the bin or receptacle 80, i.e., the upper chamber. This accumulation takes place until pressure is released by the "dead-man" control on the operator's handle, whereupon the pressure beneath the valve end 113 is released and is opened by gravity. The beads, thereupon, fall down to the lower portion of the casing.

The operation is a continuous one, and it has been found that the glass beads may be used over and over again without detriment to them; but those that are chipped or otherwise present rough edges are separated by the separator.

The portable apparatus above described is particularly useful in larger applications of cleaning, i.e., where whole surfaces, as distinguished from small articles, need to be cleaned, the rust removed and the surface improved for wearing qualities, as a very large volume can be handled by the machine in a continuous operation.

The above description and drawings disclose a single embodiment of the invention, and specific language has been employed in describing the several figures. It will be understood, however, that no limitations of the scope of the invention are thereby contemplated and that various alterations and modifications may be made such as would occur to one skilled in the art to which the invention relates.

We claim:

1. A glass bead peening machine comprising a housing, said housing being divided by a partition into an upper partial pressure chamber and a lower pressure chamber, the top of said upper chamber including a separator and a connection for a suction hose, the bottom of the lower chamber being connected to a blasting hose and nozzle via a metering valve, said partition having a passageway communicating said upper chamber to said lower chamber, valve means for closing said passageway during operation and opening said passageway during shutdown.

2. The structure of claim 1 wherein the upper chamber is provided with a conduit leading to receptacle means.

3. The structure of claim 1, wherein said partition is substantially cone-shaped in cross-section and forms a hopper for beads passed through the separator.

4. The structure of claim 1 wherein the metering valve includes means for automatically closing the communication between the lower chamber and the blasting hose and nozzle in response to the pressure in said lower chamber.

5. The structure of claim 1 wherein the metering valve includes means for adjusting the opening in said valve.

6. The structure of claim 5 wherein the adjusting means includes hand operated crank means.

7. A glass bead peening machine comprising a housing, said housing being divided by a partition into an upper partial pressure chamber and a lower pressure chamber, the top of said upper chamber including a separator and a connection for a suction hose, the bottom of the lower chamber being connected to a blasting hose and nozzle via a metering valve, said partition having a passageway comprising a valve mouth and seat communicating said upper chamber to said lower chamber, a pop-up valve in said lower chamber for closing said passageway during operation whereby the difference in pressures in the chambers created during operation causes said valve to seat and close the passageway.

8. The structure of claim 7 wherein the pop-up valve is provided with gravity responsive means to automatically open the passageway during shut-down.

No references cited.